US012222790B2

(12) United States Patent
Gopalakrishnan et al.

(10) Patent No.: US 12,222,790 B2
(45) Date of Patent: Feb. 11, 2025

(54) POWER MANAGEMENT FOR UNIVERSAL SERIAL BUS (USB) TYPE-C PORT

(71) Applicant: Intel Corporation, Santa Clara, CA (US)

(72) Inventors: Venkataramani Gopalakrishnan, Folsom, CA (US); Ravishankar S., Bangalore (IN); Yaniv Hayat, Folsom, CA (US); Yi Jen Huang, Kaohsiung (TW)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 17/131,533

(22) Filed: Dec. 22, 2020

(65) Prior Publication Data

US 2022/0197364 A1 Jun. 23, 2022

(51) Int. Cl.
*G06F 1/3234* (2019.01)
*G06F 9/4401* (2018.01)
*G06F 13/42* (2006.01)

(52) U.S. Cl.
CPC .......... *G06F 1/3253* (2013.01); *G06F 9/4418* (2013.01); *G06F 13/4282* (2013.01); *G06F 2213/0042* (2013.01)

(58) Field of Classification Search
CPC .. G06F 1/3253; G06F 9/4418; G06F 13/4282; G06F 2213/0042
See application file for complete search history.

(56) References Cited

U.S. PATENT DOCUMENTS 5,842,028 A * 11/1998 Vajapey ................ G06F 1/3203
713/340
5,867,718 A * 2/1999 Intrater ................ G06F 1/3215
713/323

(Continued)

FOREIGN PATENT DOCUMENTS

CN 101393542 A 3/2009
KR 10-2017-0090655 A 8/2017

OTHER PUBLICATIONS

International Search Report and Written Opinion, PCT App. No. PCT/US2021/051120, Dec. 28, 2021, 10 pages.

(Continued)

*Primary Examiner* — Aurel Prifti
(74) *Attorney, Agent, or Firm* — NICHOLSON DE VOS WEBSTER & ELLIOTT LLP

(57) ABSTRACT

A power management scheme for USB systems. For Mobile systems that has re-timer, a handshake is used between power delivery (PD) controller, re-timer and embedded controller (EC) so that the PD controller can end higher wattage power contract on USB-C connector after TBT/USB4 link is in low power (CLd/U3) and during system low power transition allowing Dynamic Platform and Thermal Framework (DPTF) framework to boost CPU performance and enhance battery capacity respectively. The same solution can be extended to desktop segment to allow PD controller to lower the USB-C power contract with connected devices before switching to standby rail. For mobile systems that are without re-timer, a handshake is used between BIOS, PD controller and EC so that PD controller can end higher wattage power contract on USB-C connector after TBT/USB4 link is in low power (CLd/U3) and during system low power transition.

19 Claims, 15 Drawing Sheets

(56) References Cited

U.S. PATENT DOCUMENTS

| | | | | |
|---|---|---|---|---|
| 6,065,122 | A * | 5/2000 | Wunderlich | G06F 1/3228 713/400 |
| 6,421,782 | B1 * | 7/2002 | Yanagisawa | G06F 1/1632 726/4 |
| 10,379,597 | B2 * | 8/2019 | Manabe | G06F 1/266 |
| 11,126,256 | B1 * | 9/2021 | Gruber | G06F 1/3293 |
| 2005/0198417 | A1 * | 9/2005 | Chaiken | G06F 1/3209 710/104 |
| 2009/0307436 | A1 * | 12/2009 | Larson | G06F 11/0712 714/49 |
| 2012/0317446 | A1 * | 12/2012 | Jaramillo | G06F 11/221 714/43 |
| 2015/0362984 | A1 * | 12/2015 | Waters | G06F 1/3287 713/324 |
| 2016/0055009 | A1 * | 2/2016 | Sakamoto | G06F 1/3287 710/14 |
| 2017/0017604 | A1 * | 1/2017 | Chen | G06F 11/3027 |
| 2017/0257273 | A1 * | 9/2017 | Li | H04L 41/0866 |
| 2017/0329386 | A1 * | 11/2017 | Winemiller | G06F 1/324 |
| 2018/0227149 | A1 * | 8/2018 | Johnson | H04L 25/03114 |
| 2019/0068397 | A1 * | 2/2019 | Chen | H04L 12/40 |
| 2019/0086994 | A1 * | 3/2019 | Regupathy | G06F 1/3215 |
| 2019/0087295 | A1 * | 3/2019 | Sultenfuss | G06F 11/2733 |
| 2019/0138078 | A1 * | 5/2019 | Regupathy | G06F 1/3253 |
| 2019/0220075 | A1 | 7/2019 | Kim | |
| 2019/0260241 | A1 * | 8/2019 | Park | H04L 5/0055 |
| 2020/0174823 | A1 * | 6/2020 | Li | G06F 9/4418 |
| 2022/0037899 | A1 * | 2/2022 | Natarajan | G06F 1/28 |
| 2022/0155846 | A1 * | 5/2022 | Woodbury | G06F 1/1632 |
| 2022/0182102 | A1 * | 6/2022 | Park | H04W 52/383 |

OTHER PUBLICATIONS

European Search Report and Search Opinion, EP App. No. 21911794. 2, Oct. 25, 2024, 11 pages.

* cited by examiner

POWER MANAGEMENT FOR UNIVERSAL SERIAL BUS (USB) TYPE-C PORT

BACKGROUND

Universal Serial Bus (USB) ports are widely used in various types of computing devices. A USB circuitry (e.g., headphones, flash drive) is connected to a computing device (e.g., laptop, desktop) via a USB cable. It may be desirable to save power by, for example, transitioning one or more components of the USB circuitry to a sleep mode or to a low power state while, for example, the computing device coupled to the USB circuitry enters a low power state.

USB Type-C connector offers capability to support Display, Power and Data, all in single cable/connector. In some embodiments, a USB type-C port circuitry may include motherboard components, e.g., which may not be power optimized. These components can contribute to non-trivial amount of power consumption during low power system states, creating issues for long battery life of mobile systems.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
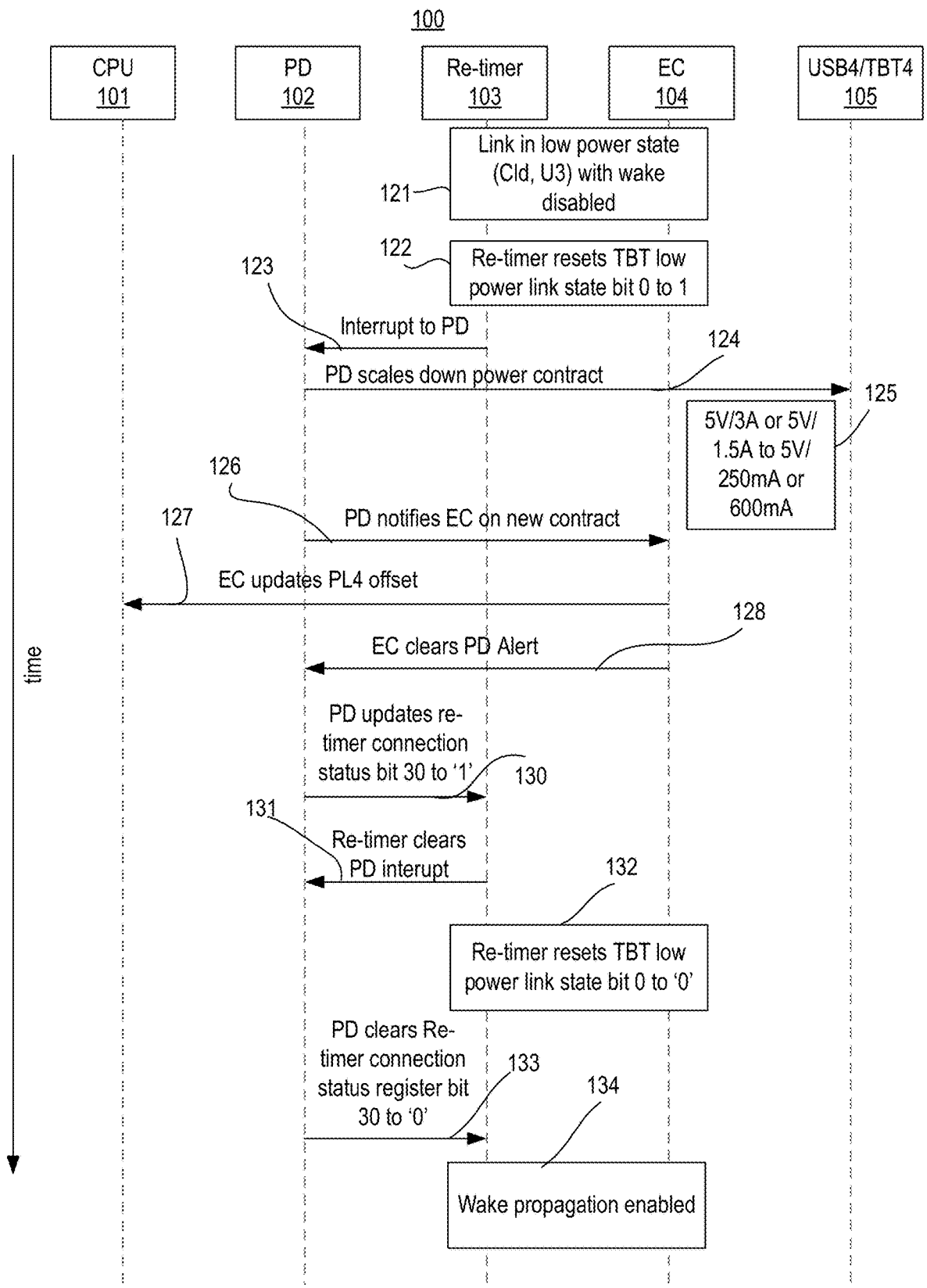
FIG. 1 illustrates a flowchart with built-in timing diagram for a system with EC and a re-timer—USB4 link CLd or USB4 link U3 entry flow, in accordance with some embodiments.

USB-C and Thunderbolt (TBT) technology has rapidly evolved and adapted by the industry in the past few years. USB4 uses the same cable and connector technology for data exchange between a host computer and a wide range of simultaneously accessible peripherals. USB4 is expected to allow rapid adaption of USB-C technology across all segments of consumer products.

USB3 defines four link power states—U0, U1, U2, and U3. U0 is an active state for data transfer. In this state, the USB device and cable are fully powered. U1 is a standby state with fast recovery. There is no data transfer in U1 state and the power consumed is less than U0. If there is no bus activity, host/device can issue a request to go into U1 state. The other partner can accept or reject the request. If the other partner accepts, the link enters the U1 state. Otherwise, it remains in the U0 state Later, if any link partner requests to access the link, it sends the U1 Low Frequency Periodic Signaling (LFPS) Exit command to exit the U1 state. Finally, the link comes back to U0 from U1. The transition time from U1 to U0 is within microseconds. U2 is a standby state with slow recovery. The link partner can enter U2 state in two ways—enter U2 state from U0 state, and enter U2 state from U1 state. U3 state is the suspend state. This is the highest link power saving state. The Host requests the device to enter the U3 state. The device must accept the request and enter the U3 state. Either the Host or the device can exit the U3 state to U0 state. The transition time from U3 to U0 is in milliseconds.

USB legacy devices, USB4 or TBT bus powered peripheral devices when connected to Mobile and Desktop systems should adhere to standard USB specification developed by the USB-IF (USB implementers forum) to meet suspend power requirements. In both mobile and desktop systems, when the link state on a connected port is at its lowest power state (e.g., CLd or U3) there is an opportunity to utilize the underlying Dynamic Platform and Thermal Framework (DPTF) to improve processor performance and to preserve the battery from being overstressed in turbo mode events. This will maximize system-on-chip (SoC) performance and prevent overstressing of the power delivery solution of the platform when link is at its lowest power state.

In CLd state, USB4 lane adapter transmit and receive blocks are in disabled state. This is the default state before link initialization. In this state, USB4 devices are disconnected or system enters a low power state. Here, lane adapter is an adapter that interfaces to a lane. A USB4 Port contains two Lane Adapters—a Lane 0 Adapter and a Lane 1 Adapter.

Here, the term lane refers to a high-speed differential signaling pair that provides communication between two USB4 devices.

On Desktop platform where there is a requirement to transition to standby rail during SOix or Sx for PS_ON implementation, the same mechanism proposed herein can be used to meet the requirement of California Energy Commission (CEC). Here, SOix-states represent residency in SoC idle standby power states. The SOix states shut off part of the SoC when they are not in use. The SOix states are triggered when specific conditions within the SoC are achieved. For example, when certain components are in low power state, SOix state is triggered. The SoC consumes the least amount of power in the deepest (for example, SOi3) state. SoC power states are also defined by the Advanced Configuration and Power Interface (ACPI) specification.

Today on a sink connect, Power Delivery (PD) controller asserts PROCHOT# and ALERT# and upon reading the ALERT#, an embedded controller (EC) reads the PD Controllers source capability for the ports, add the total sourcing power to all connected ports, write the total sourcing power to PL4 offset, clear the ALERT# and that allows processor to throttle. This happens during initial device connect and the update of PL4 does not happen dynamically based on device link states. The policy changes either when the sink is disconnected or when the source scales down the current or power, wherein the EC again reads the PD controller source capability and updates the PL4 offset to allow CPU to throttle. The implementation is static that does not dynamically scale with the link states of the connected devices in S0 (as defined by the ACPI) or when the platform is in low power state like Sx or SOix thereby impacting overall system performance.

Here PL4 is a power limit, which his part of package power control. The package power control provides settings of PL1, PL2, PL3, PL4 and Tau. Power Limit 1 (PL1) is a threshold for average power that will not exceed. It is recommended to be set to equal Thermal Design Power (TDP) power. PL1 should not be set higher than thermal solution cooling limits. Power Limit 2 (PL2) is a threshold that if exceeded, the PL2 rapid power limiting algorithms will attempt to limit the spike above PL2. Power Limit 3 (PL3) is a threshold that if exceeded, the PL3 rapid power limiting algorithms will attempt to limit the duty cycle of spikes above PL3 by reactively limiting frequency. This is an optional setting. PowerLimit4 (PL4) is a limit that will not be exceeded, the PL4 power limiting algorithms will preemptively limit frequency to prevent spikes above PL4. Turbo Time Parameter (Tau) is an averaging constant used for PL1 exponential weighted moving average (EWMA) power calculation.

Per USB specification, PD sink devices with explicit contract (PD contract) and USB suspend flag set shall meet Legacy USB suspend requirement of 125 mW (pSnkSusp=25 mW and pHubSusp=125 mW (25 mW+25 mW for up to 4 Downstream Facing Ports (DFP). These requirements are defined in the USB PD Specification 7.4.2 (Sink electrical parameters). Devices with implicit contract shall meet USB suspend requirement only if the implicit contract or USB Type-C current is at the default USB power level (Rp=500 mA for USB2, Rp=900 mA for USB3.2 2×1 and 1.5 A for USB3.2 2×2). The connection between the device's Upstream Facing Port (UFP) and its DFP port partner can be put into a suspend state based on the value of the USB Suspend Supported Flag in the Source-Capabilities Message used in the USB PD explicit power contract. When the USB Suspend Supported Flag is set by the Source, the Sink shall meet the Suspend power requirement when the USB4 link is in the CLd state.

Prior to the entry of the link into CLd state, it is expected that the host will have placed all of the device's functions into an appropriate suspend state. Suspend power is defined based on the capabilities of the USB4 device. USB4 Device that is not capable of remote wake or has remote wake disabled, has suspend power of 25 mW. USB4 Device that supports remote wake and has remote wake enabled, has suspend power of 50 mW.

USB devices may draw up to 2.5 mA during suspend. When configured, bus-powered compound devices may consume a suspend current of up to 12.5 mA. This 12.5 mA budget includes 2.5 mA suspend current for the internal hub plus 2.5 mA suspend current for each port on that internal hub having attached internal functions, up to a maximum of four ports. When a hub is in the suspend state, it must still be able to provide the maximum current per port (six unit loads per port for self -powered hubs). This is done to support remote wakeup-capable devices that will power-up while the remainder of the system is still suspended. Such devices, when enabled to do remote wakeup, must drive resume signaling upstream within 10 ms of starting to draw the higher, non-suspend current. Devices not capable of remote wakeup must not draw the higher current when suspended. Thunderbolt specification allows the sink device to draw 3 W during suspend with wake and around 1W for non-wake.

Various embodiments describe a power management scheme for USB systems. The power management scheme is provided for a system with EC and a re-timer, a system with EC but no re-timer, system without EC (e.g., desktop systems), and mobile systems.

In some embodiments, for mobile systems that has a re-timer, the scheme provides a handshake between the PD controller, re-timer and EC so that the PD controller can end higher wattage power contract on the USB-C connector after the TBT4, USB4, or USB3.2 link is in low power state (e.g., C:d or U3) and during system low power transition allowing DPTF (or dynamic turning technology) framework to boost processor (CPU) performance and enhance battery capacity respectively. A person skilled in the art would appreciated that U3 state is related to USB3.2 specification. In some embodiments, the same solution can be extended to desktops to allow the PD controller to lower the USB-C power contract with connected devices before switching to standby power rail.

In some embodiments, for mobile systems that are without re-timer, the scheme provides a handshake between BIOS, PD controller and EC so that PD can end higher wattage power contract on USB-C connector after TBT, USB4, or USB3.2 link is in low power (CLd or U3) and during system low power transition allowing DPTF framework to boost CPU performance and enhance battery capacity respectively. The same solution can be extended to desktop segment to allow PD to lower the USB-C power contract with connected devices before switching to standby rail.

In some embodiments, for desktop systems without EC and re-timer, the scheme provides a handshake between Basic Input/Output (IO)System (BIOS) and the PD controller using set of General-Purpose Input Output (GPIOs) so that PD controller can end higher wattage power contract on the USB-C connector after the TBT, USB4, or USB3.2 link is in low power state (e.g., CLd or U3) or during platform low power transition before the platform transitions to standby rail. While the embodiments are described with reference to TBT, USB4, or USB3.2, they are applicable to other device connecting interfaces.

There are many technical effects of the various embodiments. For example, systems with Thunderbolt ports or USB4 ports, can enforce the device to adhere to USB suspend standby power requirements and use the additional savings to improve CPU performance and/or extend battery life. Further, the system can support higher power capability on USB-C connector and at the same time allow greater flexibility in designing systems that can provide better battery life. Other technical effects will be evident from the various figures and embodiments.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates flowchart 100 with built-in timing diagram for a system with EC and a re-timer—USB4 link CLd or USB3.2 link U3 entry flow, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, re-timer 103, embedded controller (EC) 104, and the connected device 105 (e.g., USB4 or TBT4 device). While this flowchart is illustrated for a USB Type-C device and PD controller, the essence of the flowchart is applicable to other device specifications such as TBT4. In some embodiments, device 105 is power source device or a power sink device.

The process begins at block 121 with the background that the link between USB4 device 105 and CPU 101 is in low power state with wake disabled. For example, when USB4 link is in CLd power state or when USB4 link is in U3 power state. At block 122, re-timer 103 updates the Thunderbolt (TBT) status registers "Link Low Power entry" bit 0 to "1" and generates an interrupt to PD controller 102 as indicated by arrow 123. Re-timer 103 holds off propagating any host or device-initiated wake until the interrupt is cleared.

PD controller 102 reads the TBT status register bit 0 to confirm Link Low Power entry. PD controller 102 then scales down the power contract with the USB4/TBT3 device 105 as indicated by arrow 124. In one example, PD controller 102 scales the power contract from 5V/1.5A or 5V/3A to 5V/250 mA for USB4 bus powered devices or 5V/600 mA for TBT bus powered devices to allow device 105 to draw the required suspend current as indicated by block 125.

Figure 14:
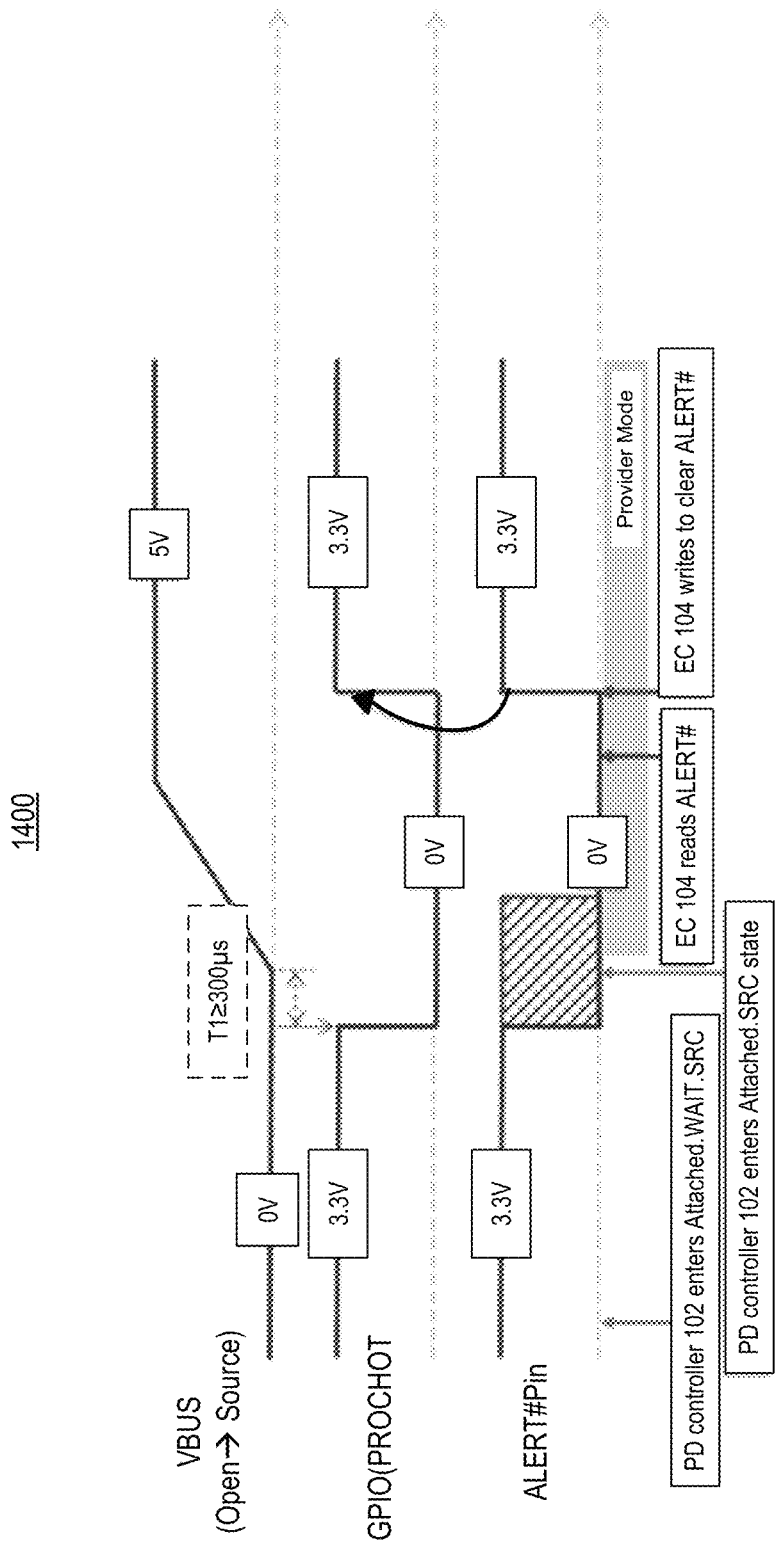
FIG. 14 illustrates a timing diagram showing Type-C power aggregation on link low power or system Sx/SOix state by an EC.

Embedded Controller (EC) 104 then gets notification from PD controller 102 on the new contract as indicated by arrow 126. EC 104 then aggregates all Type-C power from different ports and updates the PL4 offset as indicated by arrow 127. The PL4 offsets informs CPU 101 that EC 104 has reduced the power to device 105. In some embodiments, EC 104 clears PD alert interrupt that notifies PD controller 102 of the PL4 offset changes as indicated by arrow 128. The handshake between EC 104 and PD controller 102 concludes and the control is passed on to PD controller 102. FIG. 14 illustrates the processes indicated by arrows 126, 127, and 128. FIG. 14 illustrates timing diagram 1300 showing Type-C power aggregation on link low power or system Sx/SOix state by an EC.

As defined in USB Type-C Cable and Connector Specification, devices attached to the Type-C ports have to transition through CC (Configuration Channel) states before they can settle down to a specific Sink or Source role. AttachWait.SRC is one of the CC states before transition to the final state of Attached.SRC. PD controller 102 asserts both #PROCHOT and #ALERT signals to SoC 101 and/or EC 104, respectively, during AttachWait.SRC state before the final CC state to give sufficient time for SoC 101 to handle the interrupt and use the updated source power. Here, #ALERT is an indication to EC 104 that a new source contract from PD controller 102 and EC 104 is expected to update the PL4 offset with a new value before clearing the interrupt. Here, PROCHOT# is a hardware (HW) signal that is used to indicate to SoC 101 that there is a critical thermal event. PROCHOT# causes SoC 101 to go its lowest operating frequency momentarily while the system handles the underlying critical thermal event condition.

Referring back to FIG. 1, in some embodiments, PD controller 102 updates the re-timer connection state register bit (e.g., bit 30, one of the reserved bits) with a value of '1' acknowledging the reduction in contract to re-timer 103 as indicated by arrow 130. By this handshake, PD controller 102 informs re-timer 103 that PD controller 102 successfully lowered the power to USB 105, and so any wake event should not be propagated. Re-timer 103 reads this value and clears the PD interrupt and resets the TBT status registers "Link Low Power entry" bit (e.g., bit 0) to "0" as indicated by arrow 131 and block 132. As such, re-timer 103 holds off any wake. In some embodiments, PD 102 clears the re-timer connection state register bit 30 as indicated by arrow 133. Re-timer 103 now removes the hold on wakes and allows the wakes to propagate as indicated by block 134. As such, now re-timer 103 can wake up device 105 if requested.

Figure 2:
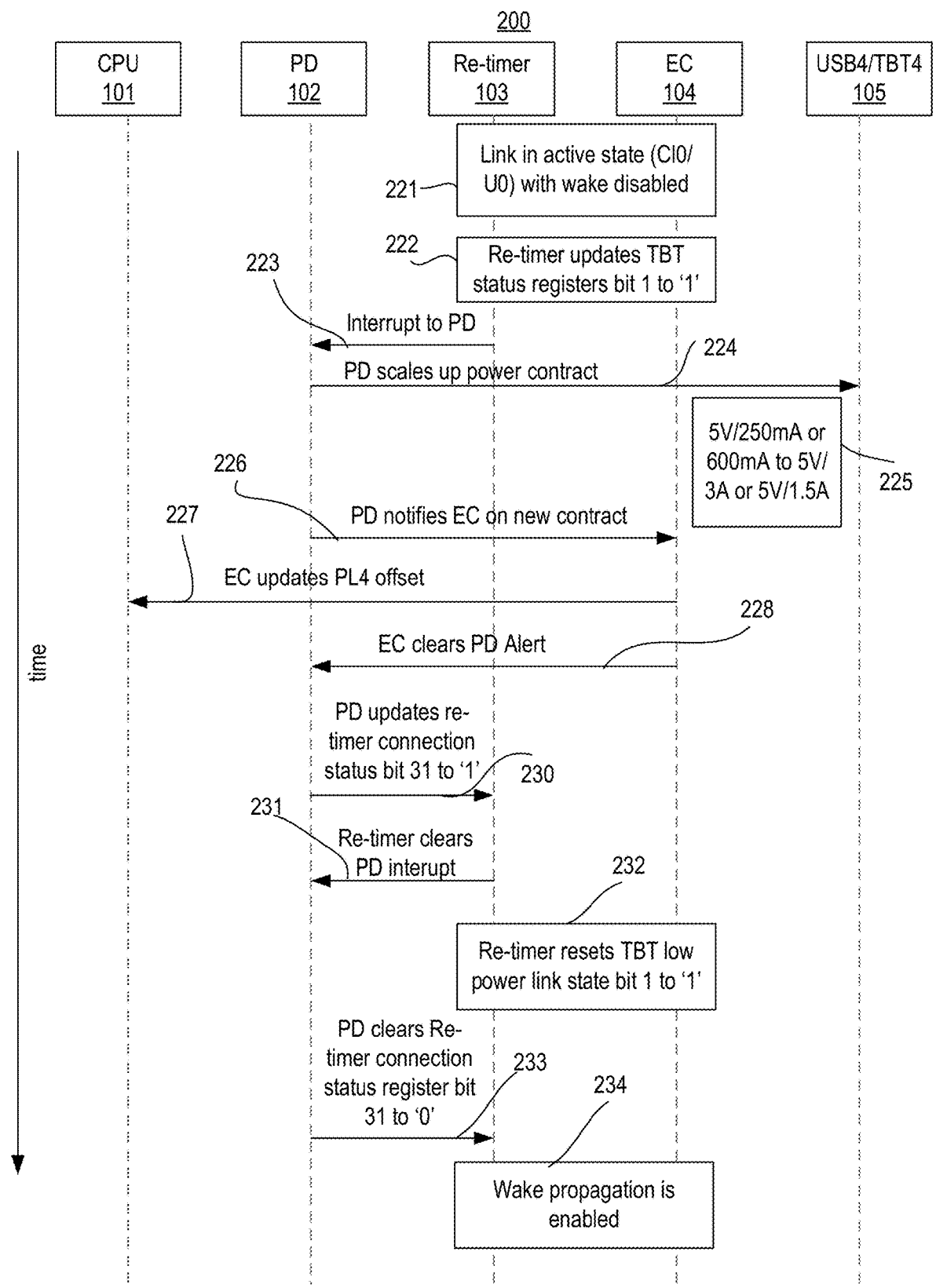
FIG. 2 illustrates a flowchart with built-in timing diagram for a system with EC and a re-timer—USB4 link CLd or USB4 link U3 exit flow, in accordance with some embodiments.

FIG. 2 illustrates flowchart 200 with built-in timing diagram for a system with EC and a re-timer—USB4 link CLd or USB link U3 exit flow, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, re-timer 103, embedded controller (EC) 104, and the connected device 105 (e.g., USB4 or TBT4 device). While this flowchart is illustrated for a USB Type-C device and PD controller, the essence of the flowchart is applicable to other device specifications such as TBT4.

The process begins at block 221 with the background that the link between USB4 device 105 and CPU 101 is in active state with wake disabled. For example, when USB4 link is in CL0 power state or when USB link is in U0 power state after the link exits from CLd on LSx wake (for USB4/TBT3 device 105) or when USB link exits U3 state upon wake (e.g., for legacy UBS device 105).

At block 222, re-timer 103 updates the TBT status registers "Link Low Power exit" bit 1 to "1" and generates an interrupt to PD controller 102 as indicated by arrow 223. In some embodiments, re-timer 103 holds off propagating any host or device-initiated wake until the interrupt is cleared. PD controller 102 then scales up the power contract to device 105 as indicated by arrow 224. For example, PD controller 102 scales up from the initial contract values of 5V/1.5A or 600 mA to 5V/1.5A or 5V/3A as indicated by block 225.

EC 104 then gets notification from PD controller 102 on the updated contract (or new power contract) as indicated by arrow 226. In some embodiments, EC 104 aggregates all USB Type-C power from different ports and updates the PL4 offset as indicated by arrow 227. In some embodiments, EC 104 clears the PD interrupt (ALERT) and informs that to PD controller 102 as indicated by arrow 227.

In some embodiments, PD controller 102 updates the re-timer connection state register bit 31 (one of the reserved bits) with a value of '1' acknowledging the restoring the contract to initial values as indicated by arrow 230. Re-timer 103 reads this value and clears the PD interrupt (ALERT) as indicated by arrow 231. At block 232, re-timer 103 resets the TBT status registers "Link Low Power exit" bit (e.g., bit 1) to "0". PD controller 102 then clears the re-timer connection state register bit (e.g., bit 31) to 0 as indicated by arrow 233. Re-timer 103 now removes the hold on wakes and allows the wakes to propagate to device 105.

Note, in some embodiments, if both the TBT status registers bit 0 and bit 1 are asserted at the same time, PD controller 102 shall assume that this is a Link Low Power exit event followed immediately after a Link Low Power Entry event or vice-versa and hence shall acknowledge re-timer 103 of low power exit (e.g., set bit 31 to "1") without doing anything.

Figure 3:
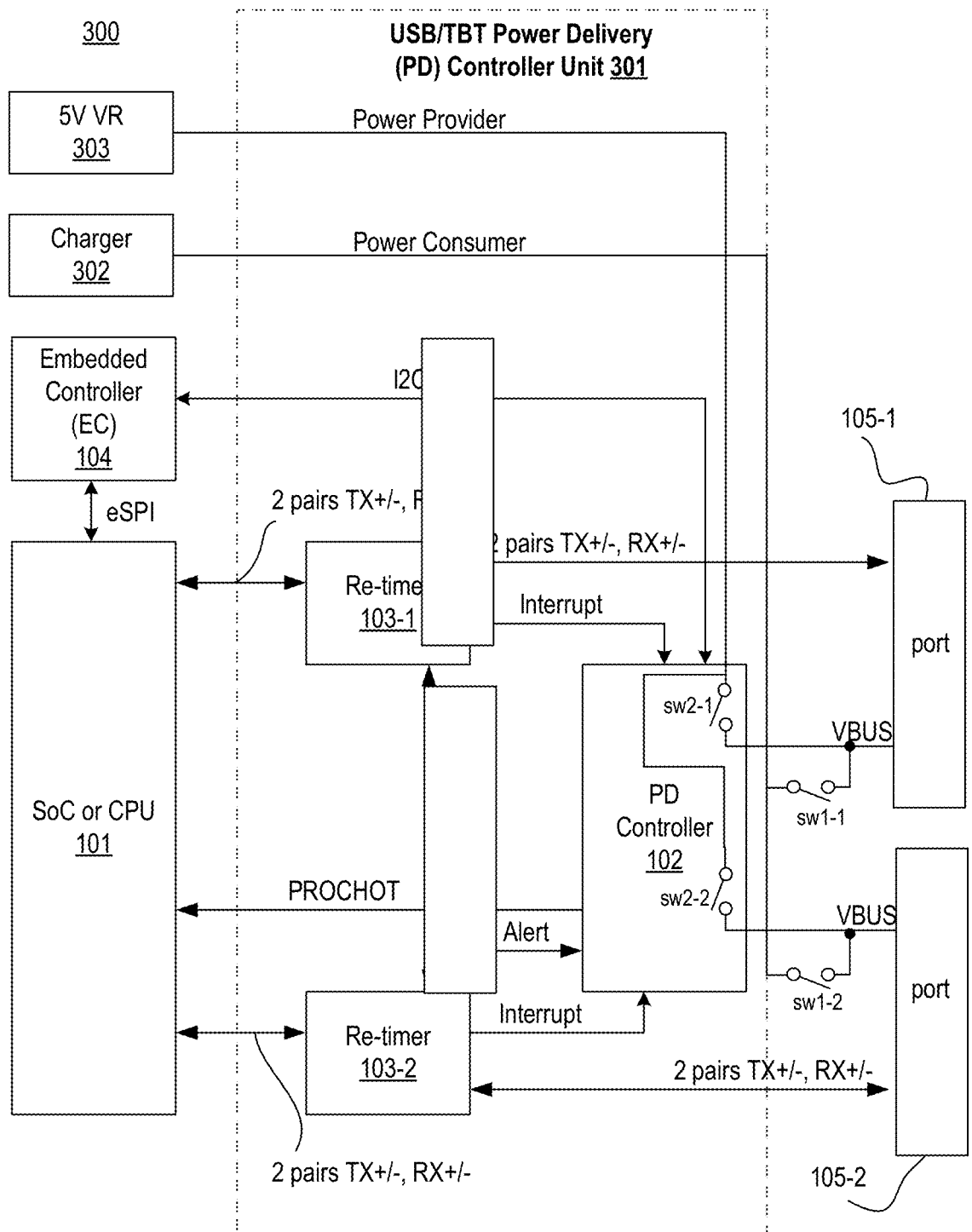
FIG. 3 illustrates a system with re-timer for throttling USB Type-C ports, in accordance with some embodiments.

FIG. 3 illustrates system 300 with re-timer for throttling USB Type-C ports, in accordance with some embodiments. System 300 comprises USB/TBT power delivery (PD) controller unit 301, charger 302, voltage regulator (VR) 303, SoC or CPU 101, embedded controller (EC) 104, and one or more USB or TBT connectors 105 (e.g., 105-1 and 105-2). Here, PD controller unit 301 comprises PD controller 102 and one or more re-timers 103 (e.g., re-timer 103-1 for device connector 105-1, and re-timer 103-2 for device connector 105-2). In some embodiments, EC 104 is coupled to SoC 101 via an enhanced serial peripheral interface bus (eSPI). In some embodiments, PD controller 102 controls the power supply VBUS to device connectors 105-1 and 105-2 via switches sw1-1, sw1-2, sw2-1, and sw2-2. For example, switches sw1-1, sw1-2, sw2-1, and sw2-2 control whether VBUS (power supply line) is being used to provide power to the connected devices or to receive power from the connected devices.

In some embodiments, USB or TBT devices connected to connectors 105-1 and/or 105-2 are powered by VR 303 (e.g., 5 V VR). In some embodiments, USB or TBT devices connected to connectors 105-1 and/or 105-2 power the system 300 via charger 302. For example, USB or TBT devices connected to connectors 105-1 and/or 105-2 power a battery of system 300. As discussed with reference to FIGS. 1-2, EC 104 communicates with PD 102 via I2C to clear the PD interrupt (ALERT), and to be notified about the new power contracts. In some embodiments, PD controller 102 communicates with re-timers (103-1 and 103-2) to update re-timer connection status bit via I2C. In some embodiments, re-timer 103-1 and/or 103-2 clears the PD interrupt (e.g., ALERT) via the I2C interface. Here, data is sent and received between SoC 101 and connectors 105-1 and 105-2 using pairs of transmitter (TX) and receiver (RX) lines (e.g., differential lines) via respective re-timers 103-1 and 103-2. In some cases, when a device is attached to the system, the device becomes a source and PROCHOT# is asserted. While system 300 is illustrated with two connectors 105-1 and 105-2, any number of device connectors may be coupled to PD controller system 301.

Figure 4:
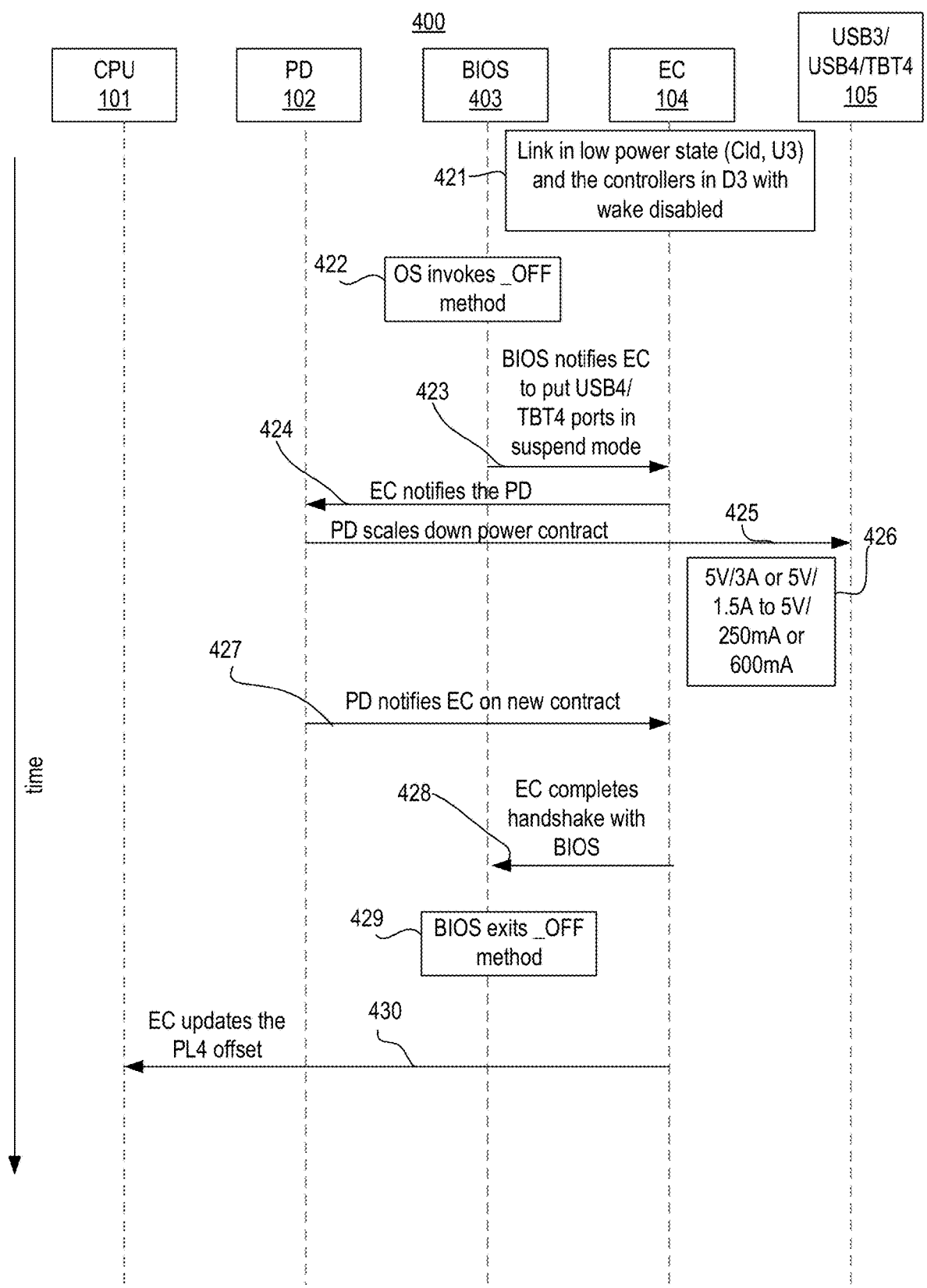
FIG. 4 illustrates a flowchart with built-in timing diagram for a system with EC but not re-timer—USB4 link CLd or USB3 link U3 entry flow, in accordance with some embodiments.

FIG. 4 illustrates flowchart 400 with built-in timing diagram for a system with EC but not re-timer—USB4 link CLd or USB3 link U3 entry flow, in accordance with some embodiments. The following section describes power management scheme for on systems that do not have re-timer 103 but do have an embedded controller (EC) for Type-C configurations. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, BIOS 403, embedded controller (EC) 104, and the connected device 105 (e.g., USB4 or TBT4 device). While this flowchart is illustrated for a USB Type-C device and PD controller, the essence of the flowchart is applicable to other device specifications such as TBT4. While the process involves BIOS 403, the functions of BIOS 403 can be performed by an operating system (OS) along or in combination with BIOS 403.

Flowchart 400 begins at block 421 with the background that the link between USB4 device 105 and CPU 101 is in low power state with wake disabled. For example, when USB4 link is in CLd power state or when USB3.2 link is in U3, power state controller transitions to D3. At block 422, OS invokes the_OFF method. BIOS 503 holds off propagating any host or device-initiated wake until the interrupt is cleared.

Here, _OFF method is a control method to put a power resource into an OFF state. The control method may not complete until the power resource is off, including any sequencing delays (between, or after operations on the power resource). Operating system directed configuration and power management (OSPM) is used to turn on or off one resource at a time. Code can use stall or sleep within the_OFF method to cause proper sequencing delays.

While in_OFF method, BIOS 403 send notification to EC 104 to put USB-C ports or device 105 to suspend mode as indicated by arrow 423. EC 104 then sends notification to PD controller 102 via host interface register of PD controller 102, as indicated by arrow 424. PD controller 102 then scales down the power contract with device 105. For example, PD controller 102 scales the contract from 5V/1.5A or 5V/3A to 5V/250 mA for USB4 bus powered devices or 5V/600 mA for TBT bus powered devices to allow device 105 to draw the required suspend current as indicated by block 426. EC 104 then gets notification from PD controller 102 and completes handshake with BIOS 403 as indicated by arrows 427 and 428, respectively. At block 429, BIOS 403 exits the_OFF method. Thereafter, EC 104 updates the PL4 offset for CPU 101. For example, EC 104 aggregates all Yype-c power contract(s) and updates the PL4 offset.

Figure 5:
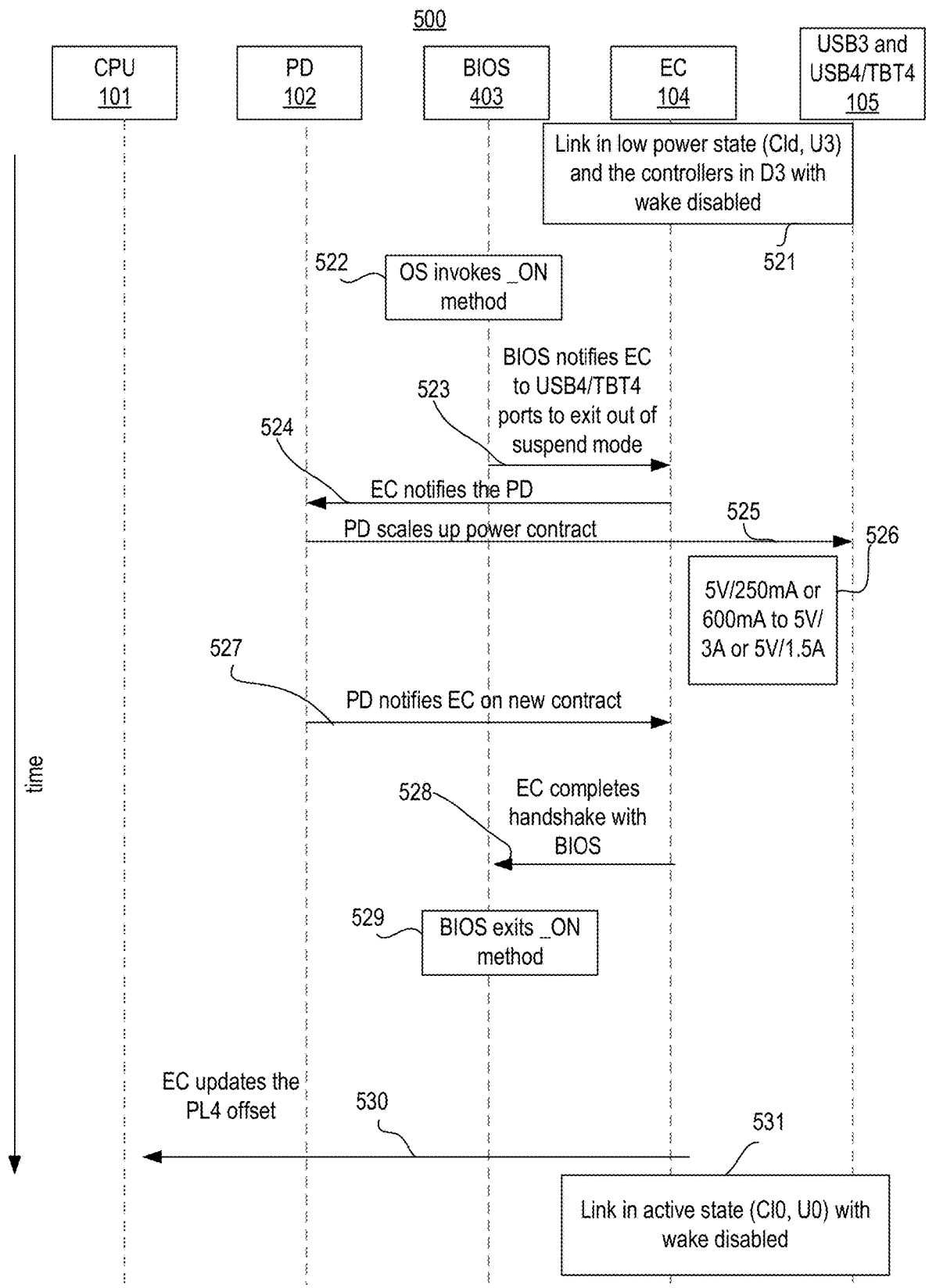
FIG. 5 illustrates a flowchart with built-in timing diagram for a system with EC but not re-timer—USB4 link CLd or USB4 link U3 exit flow, in accordance with some embodiments.

FIG. 5 illustrates flowchart 500 with built-in timing diagram for a system with EC but not re-timer—USB4 link CLd or USB link U3 and controller D3 exit flow, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, BIOS 403, embedded controller (EC) 104, and the connected device 105 (e.g., USB4 or TBT4 device). While this flowchart is illustrated for a USB Type-C device and PD controller, the essence of the flowchart is applicable to other device specifications such as TBT4. While the process involves BIOS 403, the functions of BIOS 403 can be performed by an operating system (OS) along or in combination with BIOS 403.

The process begins at block 521 with the background that the link between USB4 device 105 and CPU101 is in active state with wake disabled. For example, when USB4 link is in CL0 power state or when USB link is in U0 power state after the link exits from CLd on LSx wake (for USB4/TBT3 device 105) or when USB3 link exits U3 state upon wake (e.g., for legacy USB3 device 105).

At block 522, OS invokes the_ON method when need to exit low power state. Here, _ON method refers to a power resource control method that puts the power resource into the ON state. The control method may not complete until the power resource is on, including any required sequencing delays between, or after, operations on the power resource. OSPM is used to turn on or off one resource at a time. The code can use stall or sleep within the_ON method to cause proper sequencing delays.

During the_ON method, BIOS 403 sends notification to EC 104 to wake USB-C ports 105 or device 105 from suspend mode as indicated by arrow 523. For example, BIOS 403 notifies EC 104 to request USB4, TSB4, or legacy USB ports to exit out of suspend mode. EC 104 then sends notification to PD controller 102 via host interface register of PD controller 104 that notification is send to EC 104 to wake USB-C or TBT4 ports 105 as indicated by arrow 524. PD controller 102 scales up the power contract with device(s) 105 as indicated by arrow 525. For example, at block 526 PD controller 102 scales up the contract to 5V/1.5A or 5V/3A from the initial contract values. PD controller 102 then sends notification to EC 104 about the new power contract, and completes handshake with BIOS as indicated by arrows 527 and 528, respectively. At block 529, BIOS exists_ON method. Thereafter, EC 104 aggregates all USB Type-c power contract(s) and updates PL4 offset for CPU 101 as indicated by arrow 530. The link then operates in active state (e.g., C10, U0) with wake disabled as indicated by block 531.

Figure 6:
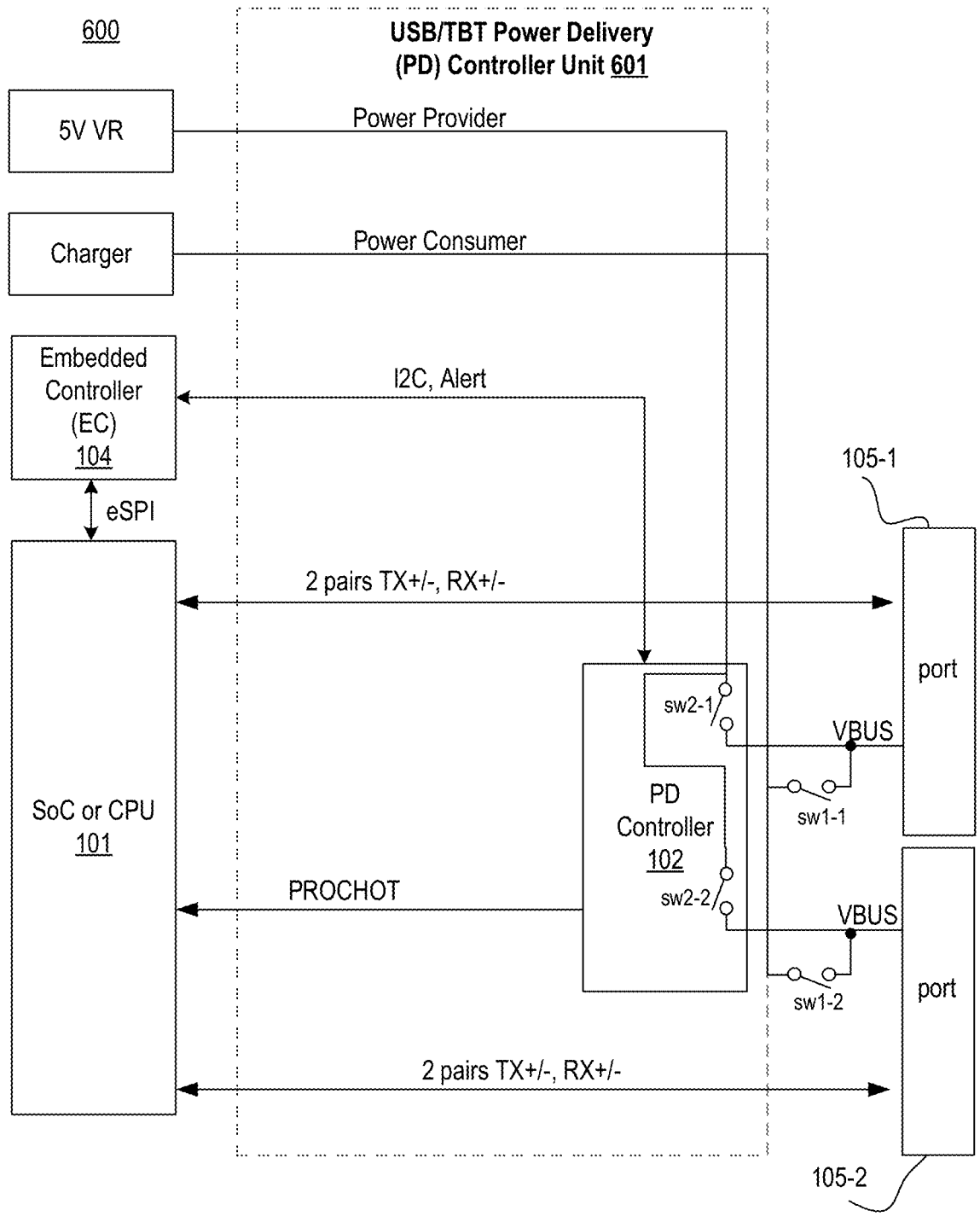
FIG. 6 illustrates a system for throttling USB Type-C ports (without a re-timer), in accordance with some embodiments.

FIG. 6 illustrates system 600 for throttling USB Type-C ports (without a re-timer), in accordance with some embodiments. System 600 is a simplified version of system 300, but in the absence of a re-timer. Here, the re-timers 103-1 and 103-2 are removed as indicated by PD controller unit 601.

Figure 7:
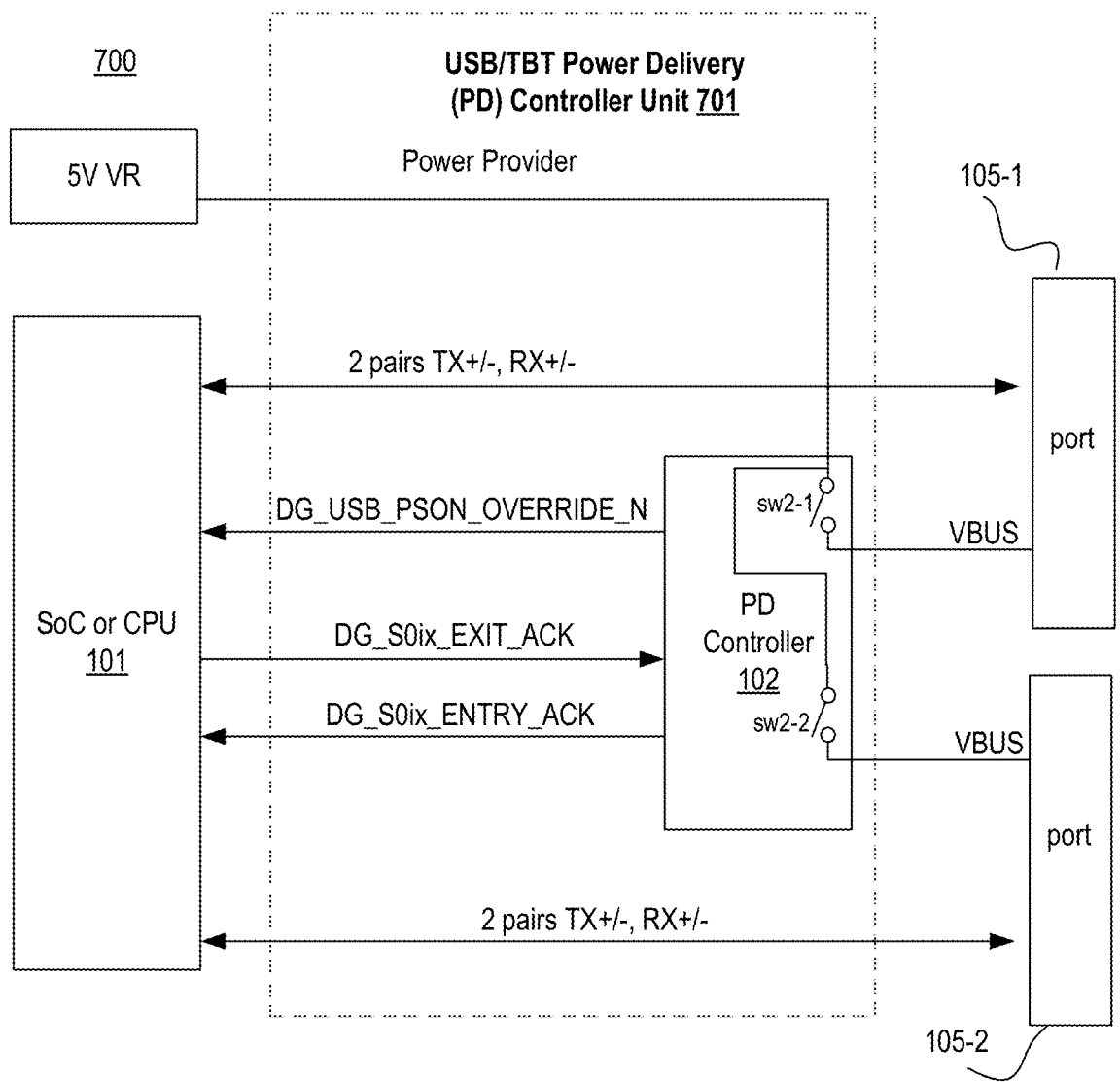
FIG. 7 illustrates a system for throttling USB Type-C ports (without a re-timer and without an EC), in accordance with some embodiments.

FIG. 7 illustrates system 700 for throttling USB Type-C ports (without a re-timer and without an EC), in accordance with some embodiments. Compared to system 300, here both EC 104 and re-timers 103-1 and 103-2 are removed as indicated by PD controller unit 701. System 700 uses GPIO for communication to SoC 101 as the I2C interface to EC 104 is missing in system 700 compared to system 300. Typically, systems without EC 104 are found in desktops (as opposed to mobile system).

When all links are in CLd or USB3.2 U3, OS places the USB4/TBT4 controllers to D3 low power state, and invokes BIOS 403 to place controller 102 to low power state through the_OFF method. While the in_OFF method, if DG_USBC_PSON_OVERRIDE_N (PSON override) is not asserted, BIOS 403 sends notification to PD controller 102 to put USB-C ports 105-1 and 105-2 to suspend mode via GPIO1. BIOS 403 uses GPIO to communicate with PD controller 102, in accordance with some embodiments. GPIO1 is asserted by BIOS 403 during device low power state or when system is transitioning to Sx or SOix. PD controller 102 understands that the system is about to enter low power state and scales the contract from 5V/1.5A or 5V/3A to 5V/250 mA for USB4 bus powered devices or 5V/600 mA for TBT bus powered devices. This handshake is illustrated by the request (DG_SOix_ENTERY_REQUEST) and acknowledgement (DG_SOix_EXIT_ACK) signals.

D3 is the lowest-powered device low-power state. These days, devices are expected to support this state. Starting with Microsoft Windows 8, the operating system subdivides D3 into two separate and distinct substates, D3hot and D3cold. Earlier versions of Windows define the D3 state, but not the D3hot and D3cold substates. However, all versions of the PCI Bus Power Management Interface Specification define separate D3hot and D3cold substates, and versions 4 and later of the Advanced Configuration and Power Interface Specification define D3hot and D3cold substates.

PD controller 102 then scales the contract from 5V/1.5A or 5V/3A to 5V/250 mA for USB4 bus powered devices or 5V/600 mA for TBT bus powered devices to allow the device to draw the required suspend current. Thereafter, PD controller 102 acknowledges BIOS 403 that low power entry sequence is complete via GPIO2 (See DG_SOix_EXIT_ACK). GPIO2 is an open drain output where PD Controller(s) 102 are tied together across all connectors. GPIO2 has a pullup on the motherboard. Due to open drain and motherboard pullup on GPIO2, after all PD Controllers have acted to end or lower PD contract GPIO2 will be asserted to BIOS 403, in accordance with some embodiments. In some embodiments, if DG_USBC_PSON_OVERRIDE_N is asserted on GPIO3, BIOS 403 override PS_ON# signal. After the logic conditions of DG_USBC_PSON_OVERRIDE_N are processed, BIOS 403 exits_OFF method.

When platform or system 700 is about to transit to low power state (SOix or Sx), OS gives notification to BIOS 403. BIOS 403 then evaluates the logic condition of DG_USBC_PSON_OVERRIDE_N. If DG_USBC_PSON_OVERRIDE_N or GPIO3 is not asserted, BIOS 403 sends notification to PD controller 102 to put USB-C ports 105-1 and 105-2 to suspend mode via GPIO1 (nor shown). Thereafter, PD controller 102 scales the contract from 5V/1.5A or 5V/3A to 5V/250 mA for USB4 bus powered devices or 5V/600 mA for TBT bus powered devices to allow the device to draw the required suspend current. In some embodiments, PD controller 102 acknowledges BIOS 403 that low power entry sequence is complete via GPIO2. BIOS 403 then restores the PS_ON state. If DG_USBC_PSON_OVERRIDE_N is asserted, BIOS 403 does nothing regarding PS_ON. At that point, BIOD 403 exits the notification. System 700 can then transition to standby power rail.

Figure 8:
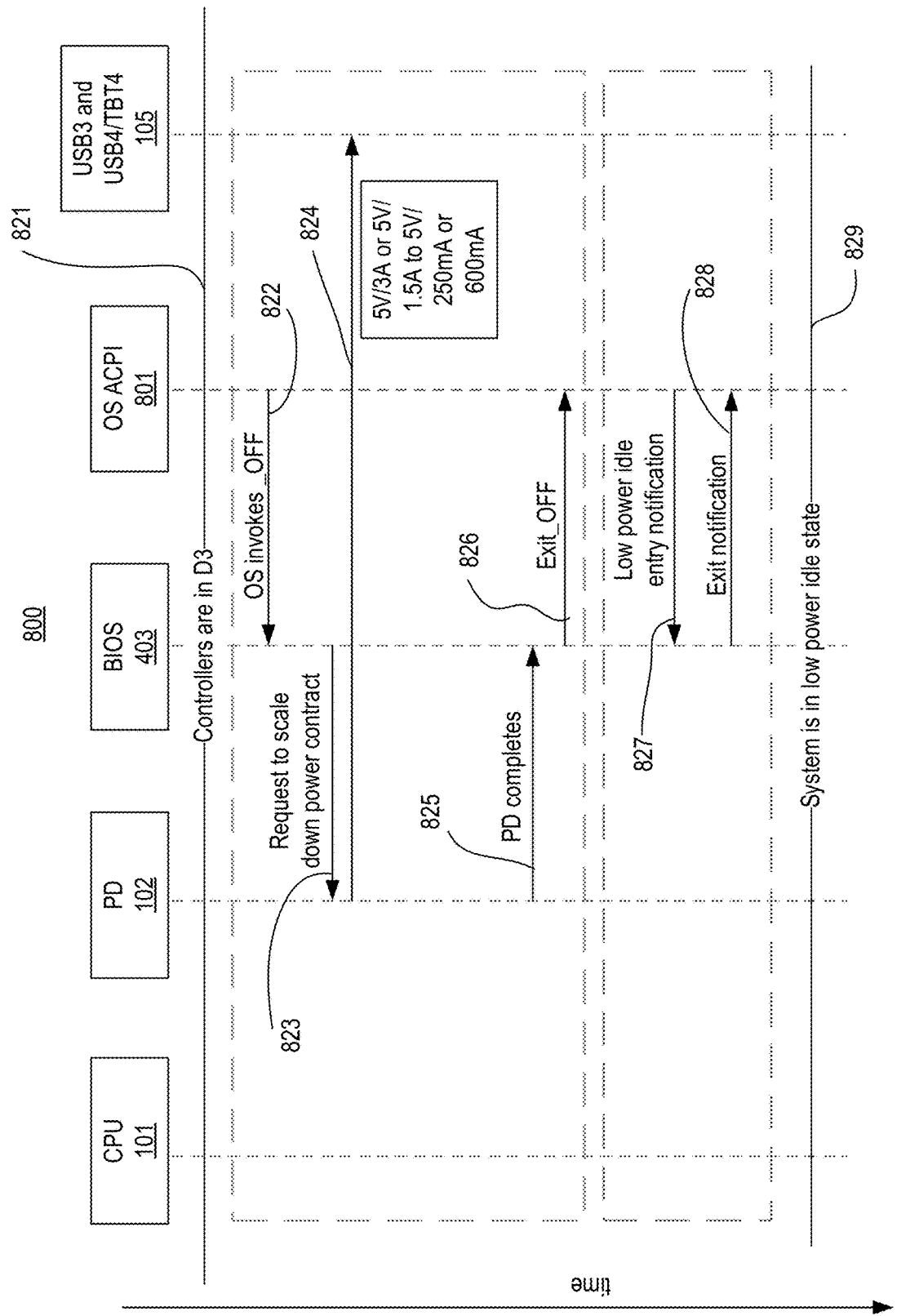
FIG. 8 illustrates a flowchart with built-in timing diagram for BIOS PD handshake during RTD3 entry or low power system transition, without an EC, in accordance with some embodiments.

FIG. 8 illustrates flowchart 800 with built-in timing diagram for BIOS PD handshake during RTD3 entry or low power system transition, without an EC, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, BIOS 403, OS ACPI 801, and the connected device 105 (e.g., USB4 or TBT4 device). While this flowchart is illustrated for a USB Type-C device and PD controller, the essence of the flowchart is applicable to other device specifications such as TBT4. While the process involves BIOS 403, the functions of BIOS 403 can be performed by an operating system (OS) along or in combination with BIOS 403. Here, the top dashed box depicts RTD3 or_OFF method when system is in S0 state. The bottom dashed box depicts the flow when system transitions to low power state (Sx or SOix).

When all links are in CLd or U3, OS 403 places controller 102 to D3 state as indicated by line 821. Thereafter, OS 403 invokes the_OFF method as indicated by arrow 822.

While the in_OFF method, if DG_USBC_PSON_OVERRIDE_N is not asserted, BIOS 403 sends notification to PD controller 102 to put USB-C ports 105-1 and 105-2 to suspend mode via GPIO1. PD controller 102 then scales down the contract from 5V/1.5A or 5V/3A to 5V/250 mA for USB4 bus powered devices or 5V/600 mA for TBT bus powered devices to allow the device to draw the required suspend current as indicated by arrows 823 and 824, respectively. Thereafter, PD controller 102 acknowledges BIOS 403 that low power entry sequence is complete via GPIO2 as indicated by arrow 825. BIOS 403 then exits OFF method as indicated by arrow 826. In some embodiments, if DG_USBC_PSON_OVERRIDE_N is asserted, BIOS 403 overrides PS_ON# signal. After the logic conditions of DG_USBC_PSON_OVERRIDE_N are processed, BIOS 403 exits_OFF method.

In some embodiments, when the platform or system 700 is about to transit to low power state (e.g., SOix or Sx), OS 801 gives notification to BIOS 403 as indicated by arrow 827. BIOS then analyses DG_USBC_PSON_OVERRIDE_N. If DG_USBC_PSON_OVERRIDE_N is asserted, BIOS 403 sends notification to PD controller 102 to put USB-C ports 105-1 and 105-2 to suspend mode via GPIO1. DG_USBC_PSON_OVERRIDE_N or GPIO3 is used to inform SoC 101 that devices connected to Type-C ports require power beyond suspend power requirements to support wake or as a general policy. In such scenarios, if GPIO3 is asserted, BIOS 403 is expected to disable PS_ON during RTD3 or low power transitions (Sx/SOix). In some embodiments, there could be a policy to allow PS_ON to be disabled in SO but enabled during low power transition independent of the GPIO3 signal state. Flowchart 900 also shows this hybrid configuration.

PD controller 102 then scales the power contract from 5V/1.5A or 5V/3A to 5V/250 mA for USB4 bus powered devices or 5V/600 mA for TBT bus powered devices to allow the device to draw the required suspend current. In some embodiments, PD controller 102 acknowledges BIOS 403 that low power entry sequence is complete via GPIO2. Thereafter, BIOS 403 restores PS_ON. In some embodiments, if GPIO3 or DG_USBC_PSON_OVERRIDE_N is not asserted, BIOS 403 may not take an additional step regarding power handling as disused herein. This is because PD controller 102 would have already reduced the power contract as part of RTD3 entry (top dashed box). BIOS 403 exits the notification after analyzing the logic state of DG_USBC_PSON_OVERRIDE_N as indicated by arrow 828. After above flow of method 800, system 700 can transition to standby power rail and enters low power idle state as indicated by line 829.

Figure 9:
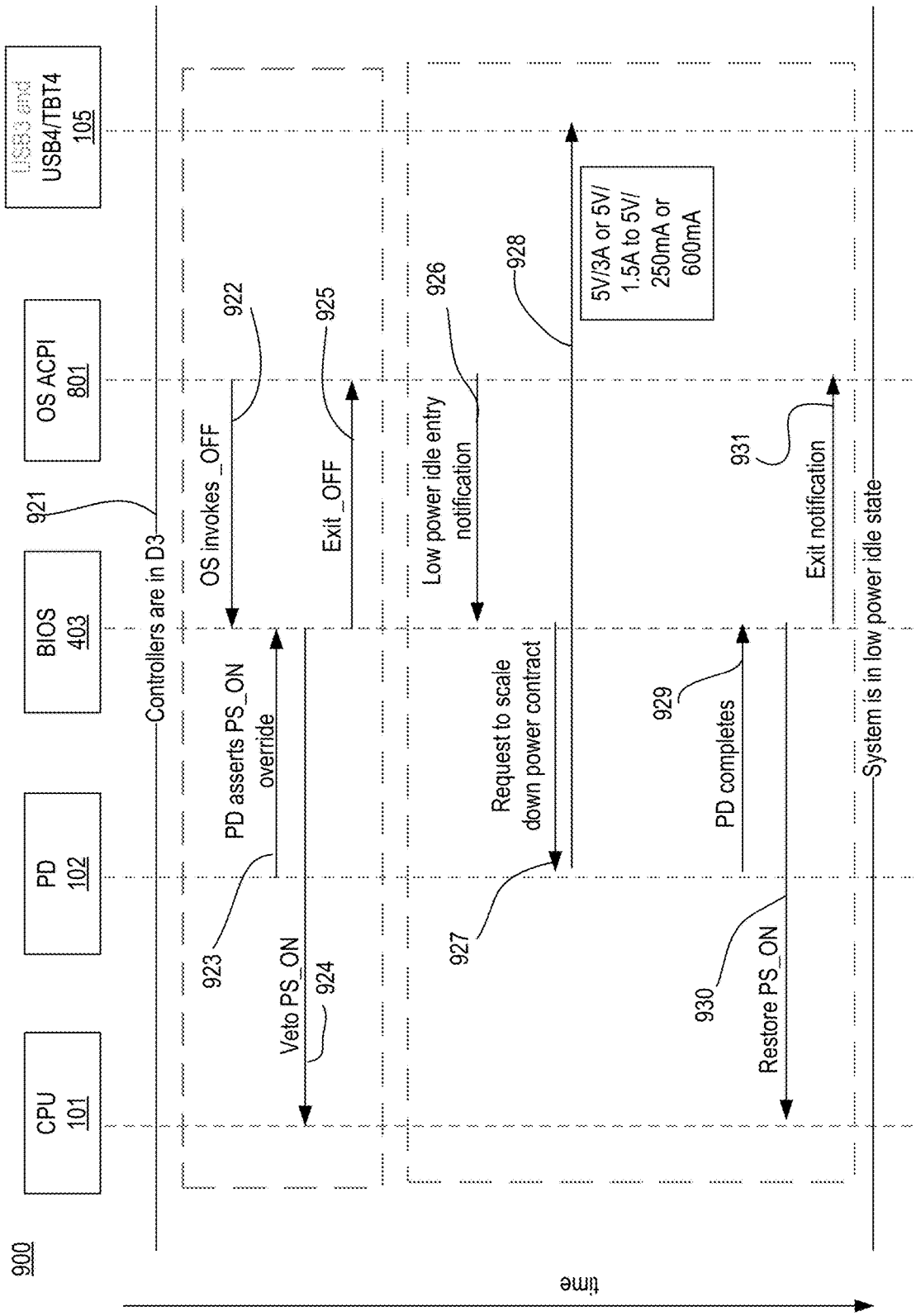
FIG. 9 illustrates a flowchart with built-in timing diagram for BIOS PD handshake during RTD3 entry or low power system transition with PS_ON override enabled and without an EC, in accordance with some embodiments.

FIG. 9 illustrates flowchart 900 with built-in timing diagram for BIOS PD handshake during RTD3 entry or low power system transition with PS_ON override enabled and without an EC, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, BIOS 403, OS ACPI 801, and the connected device 105 (e.g., USB4 or TBT4 device). While this flowchart is illustrated for a USB Type-C device and PD controller, the essence of the flowchart is applicable to other device specifications such as TBT4. While the process involves BIOS 403, the functions of BIOS 403 can be performed by an operating system (OS) along or in combination with BIOS 403.

When all links are in CLd or U3 state and USB3 and/or USB4 controllers are in D3, OS 801 sends notification of low power idle enter to BIOS 403 as indicated by arrow 921. Thereafter, OS 801 invokes the_OFF method as indicated by arrow 922. PD controller 102 then asserts PS_ON override to BIOS 403 as indicated by arrow 923. This grants PD controller 102 veto rights. In some embodiments, PD controller 102 asserts GPIO3 or DG_PSON_OVERRIDE_N prior to OS 801 invoking OFF. This event from PD controller 102 is orthogonal to OS 801 invoking the OFF method. PD Controller 102 asserting DG_PSON OVERRIDE_N or GPIO3 is an indication for BIOS 403 to disable PS_ON. In some embodiments, GPIO3 is used to indicate override of PS_ON# signal. This GPIO3 is open drain output from PD Controller(s) 102 tied together across all connectors and has pullup on the motherboard. If GPIO3 is asserted BIOS 403 will configure a platform controller hub (PCH) to override PS_ON# signal.

In some embodiments, BIOS 403 informs CPU 101 about overriding PS_ON as indicated by arrow 924. Thereafter, BIOS 403 exits the_OFF method as indicated by arrow 925. Depending on power policy, BIOS 403 can request to scale down power contract as indicated by arrow 927. BIOS 403 sends notification or request to PD controller 102 to scale down the contract. For example, PD controller 102 scales down the power contract to 5V/250 mA or 5V/600 mA from its initial state as indicated by arrow 928. PD controller 102 then sends acknowledgement (ACK) to BIOS 402 that low power entry sequence is complete as indicated by arrow 929. This notification can be done via GPIO2 (e.g., asserting DG_SOix_EXIT_ACK). BIOS 403 then sends a restore notification to CPU 101 and exit notification to OS 801 as indicated by arrows 930 and 931, respectively.

Figure 10:
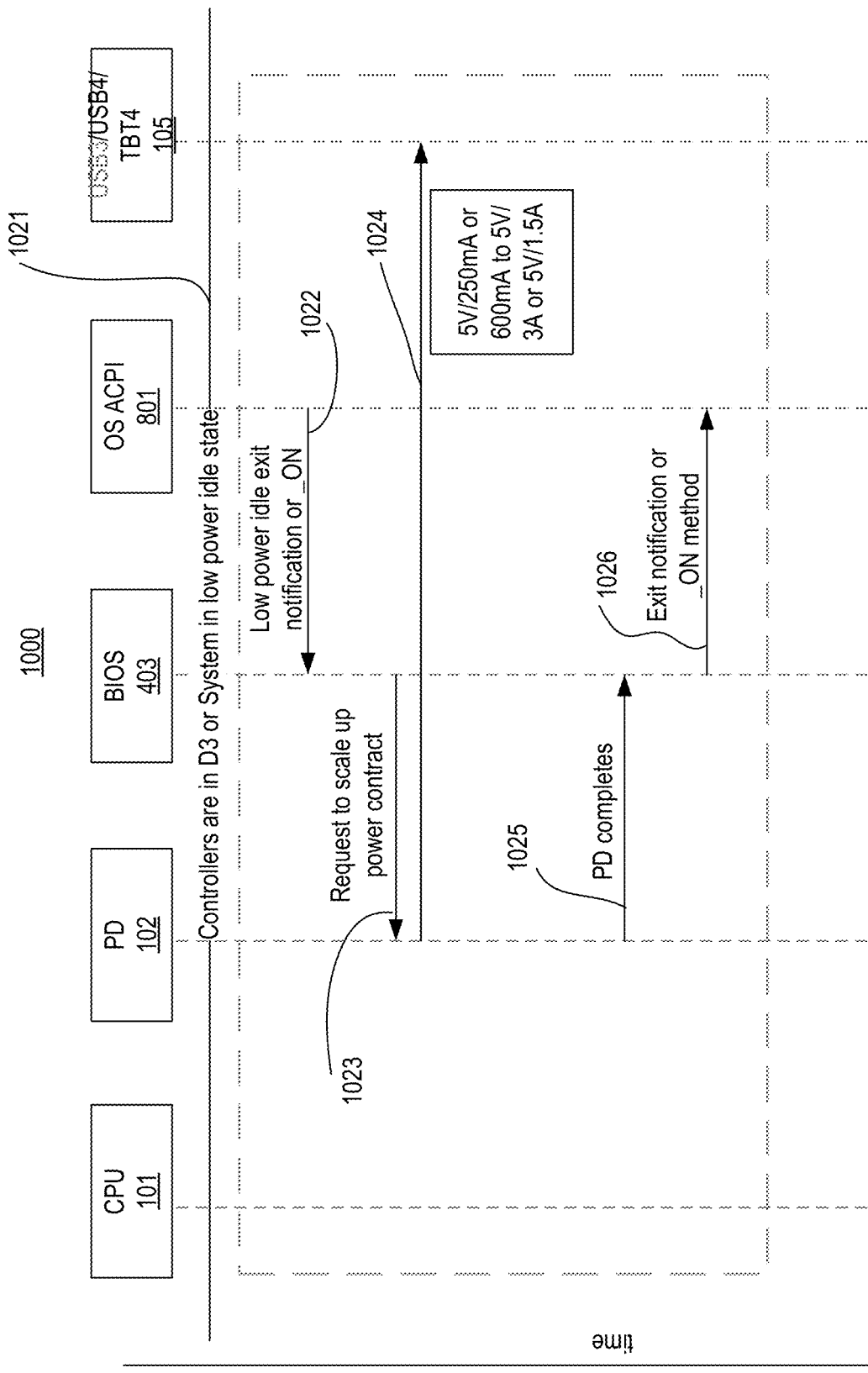
FIG. 10 illustrates a flowchart with built-in timing diagram for BIOS PD handshake during RTD3 exit from low power system transition, without an EC, in accordance with some embodiments.

FIG. 10 illustrates flowchart 1000 with built-in timing diagram for BIOS PD handshake during RTD3 exit from low power system transition, without an EC, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, BIOS 403, OS ACPI 801, and the connected device 105 (e.g., USB4 or TBT4 device). While this flowchart is illustrated for a USB Type-C device and PD controller, the essence of the flowchart is applicable to other device specifications such as TBT4. While the process involves BIOS 403, the functions of BIOS 403 can be performed by an operating system (OS) along or in combination with BIOS 403.

When all links are in CLd or U3, OS 403 places USB3 and/or USB4 controller 102 to D3 state as indicated by line 1021. Thereafter, OS 801 invokes the_ON method as indicated by arrow 1022. OS invokes_ON method when system 700 wants to exit low power state. While in_ON method, system 700 transitions to high capacity power rail. Platform switches from +5V standby to +12V SO rail. This is handled as part of on-board glue logic that takes PS_ON and low power signals from SoC as inputs.

BIOS 403 requests to scale up power contract as indicated by arrow 1023. BIOS 403 sends notification to PD controller 102 to exit out of low power transition via GPIO. PD controller 102 then scales up the contract to 5V/1.5A or 5V/3A from its initial state as indicated by arrow 1024. PD controller 102 then sends acknowledgement to BIOS 402 that low power exit sequence is complete as indicated by arrow 1025. This notification can be done via GPIO2. BIOS 403 then sends an exit notification to OS 801 and exits the_ON method as indicated by arrow 1026.

Figure 11:
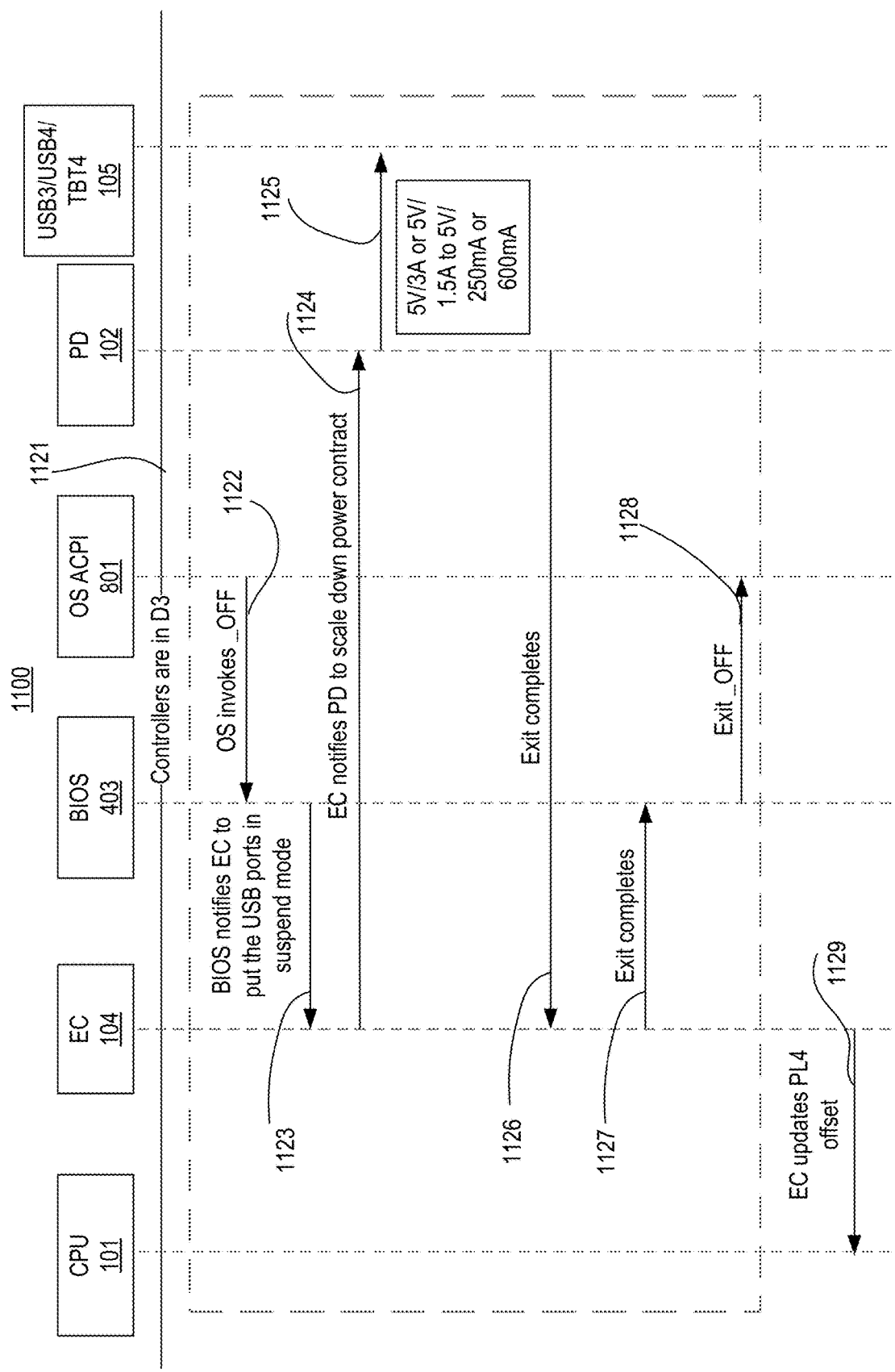
FIG. 11 illustrates a flowchart with built-in timing diagram for BIOS PD handshake during RTD3 entry or low power system transition, with an EC but without a re-timer, in accordance with some embodiments.

FIG. 11 illustrates flowchart 1100 with built-in timing diagram for BIOS PD handshake during RTD3 entry or low power system transition, with an EC but without a re-timer, in accordance with some embodiments. While the operational blocks and arrows are shown in a particular order, the order can be modified. For example, some blocks can be performed before others, while some blocks can be performed in parallel. The blocks are performed by hardware, software, or a combination of them. Here, the various communications are between CPU 101 (e.g., SoC of FIG. 15), power delivery (PD) controller 102, EC 104, BIOS 403, OS ACPI 801, and the connected device 105 (e.g., USB4 or TBT4 device). While this flowchart is illustrated for a USB Type-C device and PD controller, the essence of the flowchart is applicable to other device specifications such as TBT4. While the process involves BIOS 403, the functions of BIOS 403 can be performed by an operating system (OS) along or in combination with BIOS 403.

When all links are in CLd or U3, OS or BIOS 403 places controller 102 to D3 state as indicated by line 1121. Thereafter, OS 801 invokes the_OFF method as indicated by arrow 1122. In response, BIOS 403 notifies EC 104 to put the USB ports or device 105 in suspend mode as indicated by arrow 1123. EC 104 then notifies PD controller 102 to scale down power contract as indicated by arrow 1124. In one example PD controller 102 scales the power contract down from 5V/1.5A or 5V/3A to 5V/250 mA for USB4 bus powered devices or 5V/600 mA for TBT bus powered devices to allow the device to draw the required suspend current as indicated by arrow 1125. PD controller 102 then sends an exit completion indication to EC 104 as indicated by arrow 1126. EC 104 then informs BIOS 403 about the exit completion. BIOS 403 then exits the_OFF method as indicated by arrow 1128. For example, BIOS 403 informs OS ACPI 801 about exiting the_OFF method. Thereafter, EC 104 aggregates all USB Type-c power contract(s) and updates PL4 offset for CPU 101 as indicated by arrow 1129.

Figure 12:
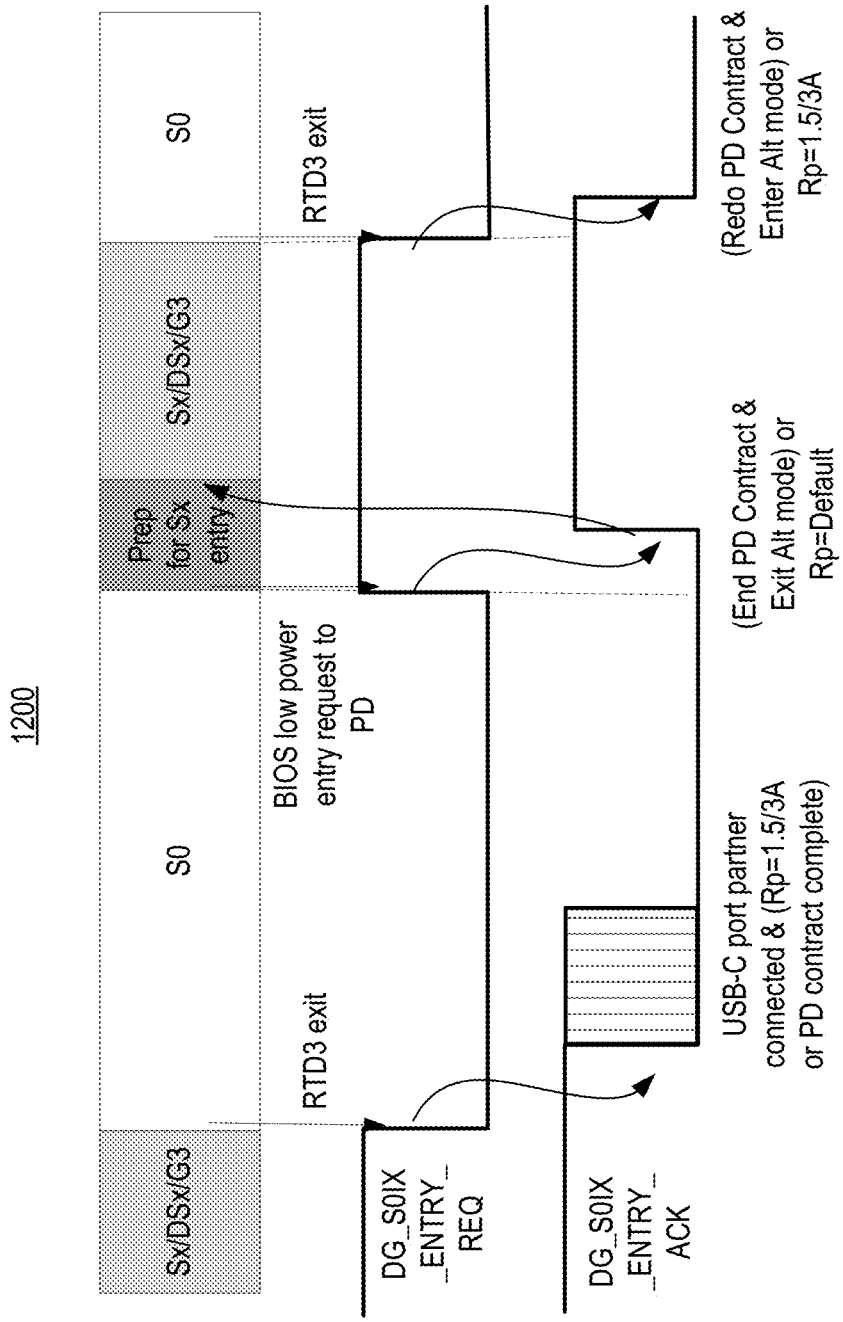
FIG. 12 illustrates a timing diagram showing Sx solution for a system without EC, in accordance with some embodiments.

FIG. 12 illustrates timing diagram 1200 showing Sx solution for a system without EC, in accordance with some embodiments. Timing diagram 1200 shows the handshake between BIOS 403 and PD controller 102 for desktop systems during Sx state. BIOS 403 uses GPIO to communicate with PD controller 102. GPIO1 is asserted by BIOS 403 during device low power state or when system is transitioning to Sx or SOix. PD controller 102 understands that the system is about to enter low power state and scales the contract from 5V/1.5A or 5V/3A to 5V/250 mA for USB4 bus powered devices or 5V/600 mA for TBT bus powered devices.

Figure 13:
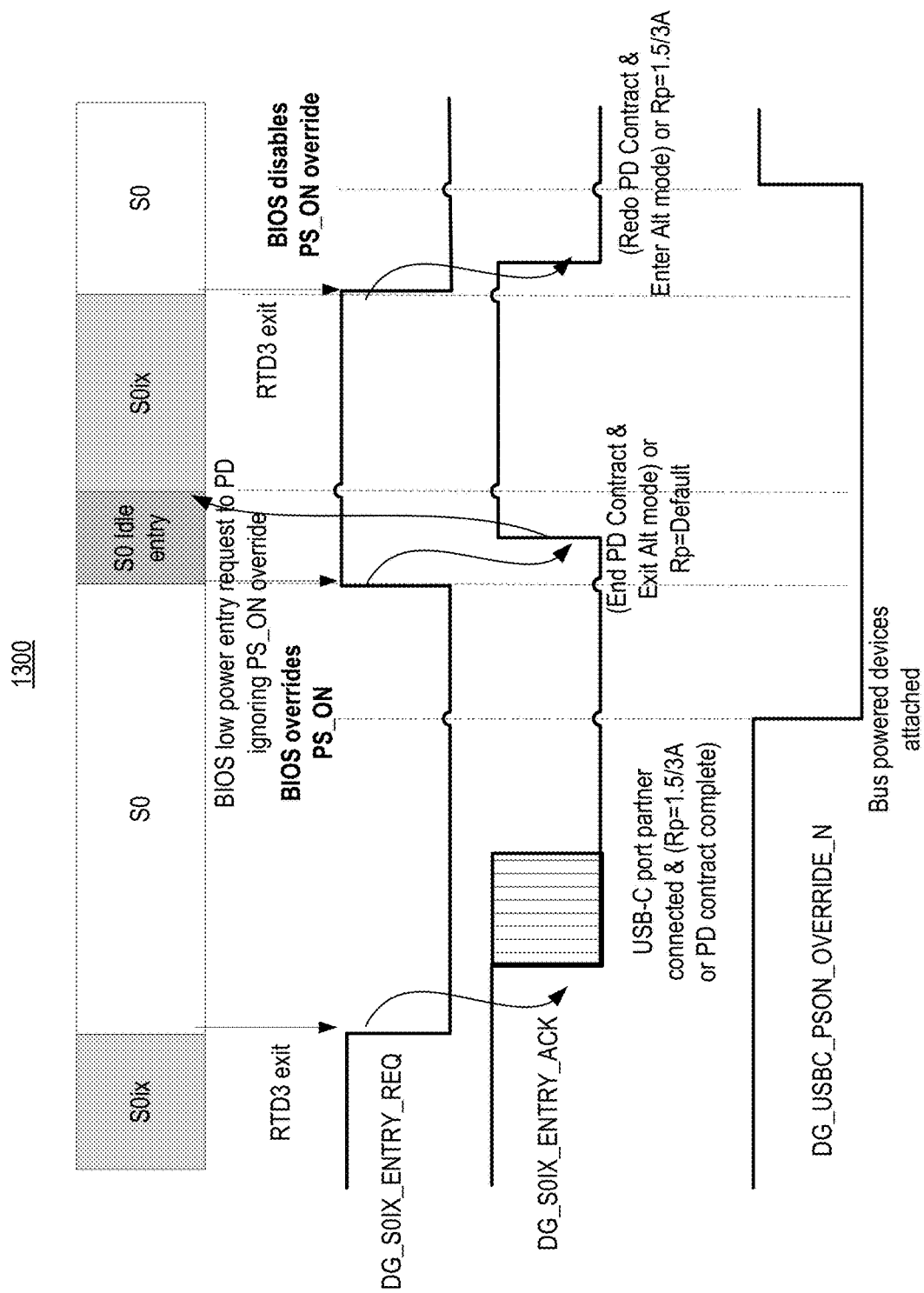
FIG. 13 illustrates a timing diagram showing SOix solution for a system without EC, in accordance with some embodiments.

FIG. 13 illustrates timing diagram 1300 showing SOix solution for a system without EC, in accordance with some embodiments. Timing diagram 1300 shows the handshake between BIOS 403 and PD controller 102 for desktop systems during SOix. GPIO2 is open drain output from PD Controllers tied together across all connectors and has pullup on the motherboard. Due to open drain and motherboard pullup on GPIO2, merely after all PD Controllers have acted to end or lower PD contract GPIO2 will be asserted to BIOS.

Figure 15:
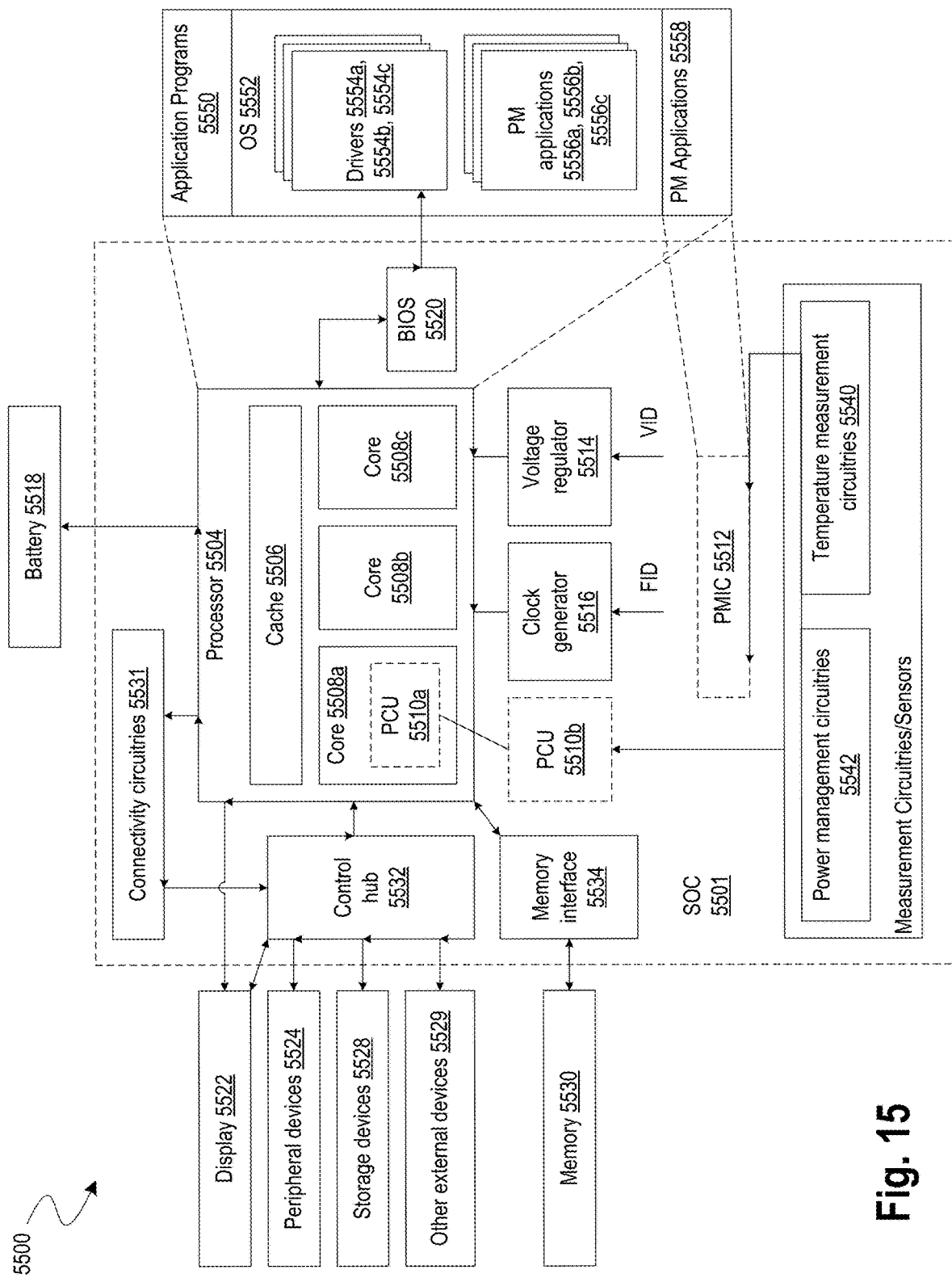
FIG. 15 illustrates a computer system or computing device with apparatus to enhance platform performance and battery life, in accordance with some embodiments.

FIG. 15 illustrates a computer system or computing device with apparatus to enhance platform performance and battery life, in accordance with some embodiments. It is pointed out that those elements of FIG. 15 having the same reference numbers (or names) as the elements of any other figure may operate or function in any manner similar to that described, but are not limited to such.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 15, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508*a*, 5508*b*, 5508*c*. Although merely three cores 5508*a*, 5508*b*, 5508*c* are illustrated in FIG. 15, processor 5504 may include any other appropriate number of processing cores, e.g., tens, or even hundreds of processing cores. Processor cores 5508*a*, 5508*b*, 5508*c* may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508*a*, a second section of cache 5506 dedicated to core 5508*b*, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510*b*.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance. Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/- 10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor may also be a dielet or chiplet.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here, the term "interconnect" refers to a communication link, or channel, between two or more points or nodes. It may comprise one or more separate conduction paths such as wires, vias, waveguides, passive components, and/or active components. It may also comprise a fabric. In some embodiments, a p-unit is coupled to an OS via an interface.

Here the term "interface" generally refers to software and/or hardware used to communicate with an interconnect. An interface may include logic and I/O driver/receiver to send and receive data over the interconnect or one or more wires.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a power delivery controller; and a re-timer coupled to the power delivery controller, wherein the power delivery controller is coupled to a device connector which is configured to be coupled to power source device or a power sink device, wherein the re-timer generates an interrupt to the power delivery controller when a link between the device connector and the power source device or the power sink device is in low power state with disabled wake.

Example 2: The apparatus of example 1, wherein the re-timer holds off propagating any host-initiated or device-initiated wake until the interrupt is cleared.

Example 3: The apparatus of example 1, wherein the power delivery controller reads a status register bit to confirm that the link has entered the low power state.

Example 4: The apparatus of example 1, wherein the power delivery controller is to scale down a power contract with the power sink device to allow the power sink device to draw a suspend current.

Example 5: The apparatus of example 4, wherein the power delivery controller is to send a notification of the power contract to an embedded controller.

Example 6: The apparatus of example 5, wherein the embedded controller is to aggregate all power from one or more connectors including the device connector and updates a PL4 offset to a processor.

Example 7: The apparatus of example 6, wherein the embedded controller clears an Alert interrupt and notifies the power delivery controller of change to the PL4 offset.

Example 8: The apparatus of example 7, wherein the power delivery controller updates a re-timer connection state register bit in the re-timer, and as such, the re-timer acknowledges reduction in the power contract with the device.

Example 9: The apparatus of example 8, wherein the re-timer reads the re-timer connection state register and clears the interrupt to the power delivery controller.

Example 10: The apparatus of example 9, wherein the power delivery controller clears the re-timer connection state register bit.

Example 11: The apparatus of example 10, wherein the re-timer removes any holds off on propagating any host-initiated or device-initiated wake.

Example 12: The apparatus of example 1, wherein the low power state is one of U3 or CLd state.

Example 13: The apparatus of example 1, wherein the power source device or the power sink device is one of a Universal Serial Bus (USB) device or Thunderbolt device, and wherein the link is one of the USB link or a thunderbolt link.

Example 14: An apparatus comprising: a power delivery controller; and a re-timer coupled to the power delivery controller, wherein the power delivery controller is coupled to a device connector which is configured to be coupled to power source device or a power sink device, wherein the power delivery controller scales down a power contract with the device in response to issuance of an interrupt by the re-timer to the power delivery controller.

Example 15: The apparatus of example 14, wherein the re-timer generates the interrupt to the power delivery controller when a link between the device connector and the power source device or the power sink device is in low power state with disabled wake.

Example 16: The apparatus of example 14, wherein the re-timer holds off propagating any host-initiated or device-initiated wake until the interrupt is cleared.

Example 17: A system comprising: a memory; a processor coupled to the memory; an embedded controller coupled to the processor; and a power delivery controller unit coupled to the processor and the embedded controller, wherein the power delivery controller comprising: a power delivery controller; and a re-timer coupled to the power delivery controller, wherein the power delivery controller is coupled to a device connector which is configured to be coupled to power source device or a power sink device, wherein the re-timer generates an interrupt to the power delivery controller when a link between the device connector and the power source device or the power sink device is in low power state with disabled wake.

Example 18: The system of example 17, wherein the re-timer holds off propagating any host-initiated or device-initiated wake until the interrupt is cleared.

Example 19: The system of example 17, wherein the power delivery controller reads a status register bit to confirm that the link has entered the low power state.

Example 20: The system of example 17, wherein the power delivery controller is to scale down a power contract with the power sink device to allow the power sink device to draw a suspend current.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a power delivery controller; and
a re-timer coupled to the power delivery controller, wherein the power delivery controller is coupled to a device connector which is configured to be coupled to power source device or a power sink device, wherein the re-timer generates an interrupt to the power delivery controller when a link between the device connector and the power source device or the power sink device is in low power state with disabled wake, wherein in response to the interrupt, the power delivery controller is to scale down a power contract with the power sink device to allow the power sink device to draw a suspend current.

2. The apparatus of claim 1, wherein the re-timer holds off propagating any host-initiated or device-initiated wake until the interrupt is cleared.

3. The apparatus of claim 1, wherein the power delivery controller reads a status register bit to confirm that the link has entered the low power state.

4. The apparatus of claim 1, wherein the power delivery controller is to send a notification of the power contract to an embedded controller.

5. The apparatus of claim 4, wherein the embedded controller is to aggregate all power from one or more connectors including the device connector and updates a PL4 offset to a processor.

6. The apparatus of claim 5, wherein the embedded controller clears an Alert interrupt and notifies the power delivery controller of change to the PL4 offset.

7. The apparatus of claim 6, wherein the power delivery controller updates a re-timer connection state register bit in the re-timer, and as such, the re-timer acknowledges reduction in the power contract with the device.

8. The apparatus of claim 7, wherein the re-timer reads the re-timer connection state register and clears the interrupt to the power delivery controller.

9. The apparatus of claim 8, wherein the power delivery controller clears the re-timer connection state register bit.

10. The apparatus of claim 9, wherein the re-timer removes any holds off on propagating any host-initiated or device-initiated wake.

11. The apparatus of claim 1, wherein the low power state is one of U3 or CLd state.

12. The apparatus of claim 1, wherein the power source device or the power sink device is one of a Universal Serial Bus (USB) device or Thunderbolt device, and wherein the link is one of the USB link or a thunderbolt link.

13. An apparatus comprising:
a power delivery controller; and
a re-timer coupled to the power delivery controller, wherein the power delivery controller is coupled to a device connector which is configured to be part of an interconnect link coupled to a power source device or a power sink device, wherein the power delivery controller scales down a power contract with the device in response to issuance of an interrupt by the re-timer to the power delivery controller in response to the link being in a disabled or unavailable wake state.

14. The apparatus of claim 13, wherein the re-timer generates the interrupt to the power delivery controller when a link between the device connector and the power source device or the power sink device is in low power state with disabled wake.

15. The apparatus of claim 13, wherein the re-timer holds off propagating any host-initiated or device-initiated wake until the interrupt is cleared.

16. A system comprising:
a memory;
a processor coupled to the memory;
an embedded controller coupled to the processor; and
a power delivery controller unit coupled to the processor and the embedded controller, wherein the power delivery controller unit comprising:
a power delivery controller; and
a re-timer coupled to the power delivery controller, wherein the power delivery controller is coupled to a device connector which is configured to be coupled to a power source device or a power sink device, wherein the re-timer generates an interrupt to the power delivery controller when a link between the device connector and the power source device or the power sink device is in low power state with disabled wake to reduce an allowed upper current limit for the device in the low power state.

17. The system of claim 16, wherein the re-timer holds off propagating any host-initiated or device-initiated wake until the interrupt is cleared.

18. The system of claim 16, wherein the power delivery controller reads a status register bit to confirm that the link has entered the low power state.

19. The system of claim 16, wherein the power delivery controller is to scale down a power contract with the power sink device to allow the power sink device to draw a suspend current.

\* \* \* \* \*